US011520788B2

(12) United States Patent
Tasker (10) Patent No.: US 11,520,788 B2
(45) Date of Patent: Dec. 6, 2022

(54) METHODS AND SYSTEMS FOR TRANSFORMING DISTRIBUTED DATABASE STRUCTURE FOR REDUCED COMPUTE LOAD

(71) Applicant: Insight Direct USA, Inc., Tempe, AZ (US)

(72) Inventor: Edward Carl Tasker, Columbus, OH (US)

(73) Assignee: Insight Direct USA, Inc., Chandler, AZ (US)

( * ) Notice: Subject to any disclaimer, the term of this patent is extended or adjusted under 35 U.S.C. 154(b) by 19 days.

(21) Appl. No.: 17/193,645

(22) Filed: Mar. 5, 2021

(65) Prior Publication Data

US 2022/0284024 A1    Sep. 8, 2022

(51) Int. Cl.
*G06F 16/2453*    (2019.01)
*G06F 16/27*    (2019.01)

(52) U.S. Cl.
CPC ........ *G06F 16/24542* (2019.01); *G06F 16/27* (2019.01)

(58) Field of Classification Search
CPC .......................... G06F 16/24542; G06F 16/27
See application file for complete search history.

(56) References Cited

U.S. PATENT DOCUMENTS

| | | | |
|---|---|---|---|
| 8,171,102 B2 | 5/2012 | Gladwin et al. | |
| 8,612,439 B2 | 12/2013 | Prahlad et al. | |
| 8,620,899 B2* | 12/2013 | Chen ................ | G06F 16/24539 707/717 |
| 9,965,511 B2* | 5/2018 | Collins ............ | G06F 16/24534 |
| 10,348,810 B1 | 7/2019 | Florissi et al. | |
| 2016/0092546 A1* | 3/2016 | Shivarudraiah ....... | G06Q 10/00 707/600 |
| 2017/0039218 A1 | 2/2017 | Prahlad et al. | |
| 2017/0075965 A1* | 3/2017 | Liu ..................... | G06F 16/2386 |
| 2018/0096201 A1* | 4/2018 | Bermundo ........... | G06F 3/1244 |
| 2019/0227993 A1 | 7/2019 | Prahlad et al. | |
| 2020/0301926 A1* | 9/2020 | Frantz .............. | G06F 16/24544 |
| 2021/0357406 A1* | 11/2021 | Potharaju ........... | G06F 16/2471 |

* cited by examiner

*Primary Examiner* — Dangelino N Gortayo
(74) *Attorney, Agent, or Firm* — Kinney & Lange, P.A.

(57) ABSTRACT

A method of improving compute performance of a distributed database system includes querying a control node of the distributed database system to ascertain a plurality of attributes characterizing an initial state of a table object in the distributed database system. Queries executed in the distributed database system are recorded. Based on these queries and at least some of the plurality of attributes, an candidate state of the table object with lower compute load than the initial state is generated. An executable transformation mapping the initial state of the table object to the candidate state is then assembled and applied to the table object.

10 Claims, 8 Drawing Sheets

FIG. 1

| Sales | | | |
|---|---|---|---|
| Sales_PK | Invoice_ID | Item_Line | Product_ID |
| 1 | AAAAAA | 1 | MB12 |
| 2 | BBBBBB | 1 | T31X |
| 3 | BBBBBB | 2 | T32Y |
| 4 | CCCCC | 1 | Q32X |
| 5 | CCCCC | 2 | T31X |
| 6 | CCCCC | 3 | MB12 |
| 7 | DDDDD | 1 | T32Y |
| 8 | EEEEE | 1 | Q32X |
| 9 | FFFFF | 1 | Q32X |
| 10 | FFFFF | 2 | T32Y |
| 11 | GGGGG | 1 | T32Y |
| 12 | HHHHH | 1 | Q32X |

METHODS AND SYSTEMS FOR TRANSFORMING DISTRIBUTED DATABASE STRUCTURE FOR REDUCED COMPUTE LOAD

BACKGROUND

This disclosure relates generally to database structures or schemas. More specifically, this disclosure relates to methods and corresponding systems for generating and applying transformations of database structures or schemas to distributed databases based on key inputs such as table object metadata and expected and/or historical use (e.g. queries) of table objects.

Business Intelligence (BI) technologies use data aggregated in data warehouses (DW) or similar database types to generate analytics and other useful metadata from large data sets. Current combined data storage and processing solutions such as Microsoft Azure Synapse Analytics use distributed approaches to allow queries involving such large data sets to be processed quickly, in parallel. More generally, Massively Parallel Processing (MPP) approaches to database organization divide processing tasks across multiple compute nodes governed by a single control node, thereby permitting larger data sets and/or more computationally expensive queries to be accommodated through the addition of extra compute nodes. This approach provides scalability.

Persistent data storage in an MPP database system generally involves distribution of a total data set across multiple compute nodes, with each compute node storing a table constituting a slice or subset of the total data set. Compute nodes are accessible through the control node, which receives and handles queries by distributing processing tasks across a subset of available compute nodes depending on query type and data distribution. Any particular data set can typically be distributed across multiple compute nodes in a variety of ways, with differences in table structure and distribution potentially affecting query efficiency (e.g. compute load and compute time).

SUMMARY

In one embodiment, the present disclosure is directed to a method of improving compute performance of a distributed database system. This method involves querying a control node of the distributed database system to ascertain a plurality of attributes characterizing an initial state of a table object in the distributed database system. Queries executed in the distributed database system are recorded. Based on these queries and at least some of the plurality of attributes, an candidate state of the table object with lower compute load than the initial state is generated. An executable transformation mapping the initial state of the table object to the candidate state is then assembled and applied to the table object.

In a further embodiment, the present disclosure is directed to a method of generating a computer-executable database structure transformation applicable to a table object. This method involves assembling initial table attributes of the table object, and workload attributes corresponding to queries on the table object. Preference conditions for table distribution and data types are defined via configuration values. The table object is evaluated to determine whether it is sub-optimal by comparison of the configuration values against the workload and table attributes. Where the table object is sub-optimal, an improved structure for the table object is specified by distribution and data type. An executable code mapping the table object to this improved structure is then generated.

The present summary is provided only by way of example, and not limitation. Other aspects of the present disclosure will be appreciated in view of the entirety of the present disclosure, including the entire text, claims, and accompanying figures.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

This disclosure presents methods and systems for generating and applying database structure transformations to distributed databases in MPP systems such as Microsoft Azure Synapse. Such systems distribute both data storage and query processing across multiple compute nodes, with each compute node containing at least one table object representing a subset of the database as a whole. Data can be distributed across these tables in different ways, with some distributions resulting in more computational expense than others for particular queries. As presented herein, a variety of factors including data types, quantities, and anticipated and historical usage trends are used to evaluate current database structure or schema efficiency, and to generate executable transformations capable of mapping or restructuring current database structures into new structures (i.e. new distributions) better suited to actual use conditions.

Figure 1:
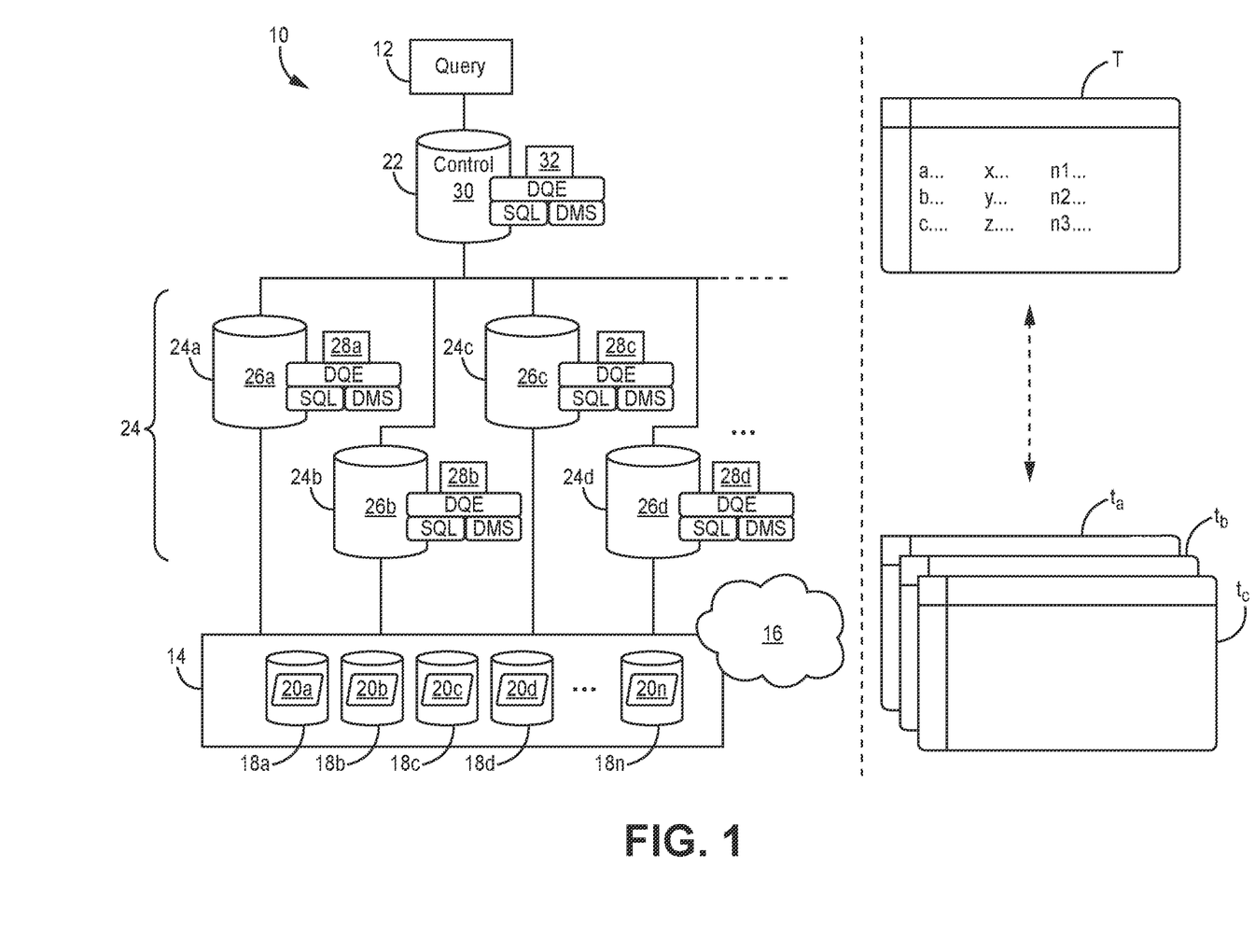
FIG. 1 is a simplified side-by-side logic and physical layer block diagram illustrating an exemplary MPP database system including a plurality of compute nodes.

FIG. 1 is a simplified module diagram of distributed database system 10. System 100 can, for example, be a Microsoft Azure Synapse system or structurally similar system. The description hereinafter will assume a Microsoft Azure Synapse system, but several tools of the approaches laid out herein have further applicability as optimization tools for other, similar MPP systems. FIG. 1 presents the physical architecture (i.e. physical layer) of distributed database system 10 alongside a representation of its user-accessible logic layer, which does not require awareness at the user level of underlying data distributions.

Distributed database system 10 processes queries 12 with regard to stored data archive 14 via multiple distributed processing nodes. Stored data archive 14 can, for example, be distributed across a cloud-based data storage network 16 consisting of multiple distributed storage devices 18a, 18b, . . . 18n (hereinafter referred to generally as distributed storage devices 18). Data storage network 16 can, for example, be a Microsoft Azure Storage system. Each distributed storage device 18 includes stored data 20a, 20b, . . . 20n (hereinafter referred to generally as stored data 20) in the form of slices or segments of an overall data set.

Queries 12 are addressed to subsets of stored data 20, and can involve both requests for specific data among stored data 20, or metadata regarding stored data 20. Queries 12 can, for example, be manual data/metadata requests from a human user, or automated requests from an upstream application process to which distributed database system 10 provides inputs. These queries are processed via distributed processing nodes including control node 22 and compute nodes 24a, 24b, 24c, . . . , etc., collectively referred to herein as compute nodes 24. Each processing node includes both data storage and processing capability. Control node 22 includes data storage 30 and data processor 32, while each compute node 24 includes a corresponding data storage 26 (26a, 26b, etc.) and data processor 28 (28a, 28b, etc.). In general, data processors 28, 32 can include any or more than one of a processor, a microprocessor, a controller, a digital signal processor (DSP), an application specific integrated circuit (ASIC), a field-programmable gate array (FPGA), or other equivalent discrete or integrated logic circuitry.

Data storage 26, 30 is machine-readable storage media. In some examples, a machine-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, data storage 26, 30 can be entirely or in part a temporary memory, meaning that a primary purpose of memory 22 is not long-term storage. Data storage 26, 30, in some examples, is described as volatile memory, meaning that memory 26, 30, does not maintain stored contents when power to nodes 22, 24 is turned off. Examples of volatile memories can include random access memories (RAM), dynamic random-access memories (DRAM), static random-access memories (SRAM), and other forms of volatile memories. In some examples, data storage 26, 30 can also include one or more machine-readable storage media. Data storage 26, 30 can be configured to store larger amounts of information than volatile memory. Data storage 26, 30 can further be configured for long-term storage of information. In some examples, data storage 26, 30 include non-volatile storage elements. Examples of such non-volatile storage elements can include magnetic hard discs, optical discs, flash memories and other forms of solid-state memory, or forms of electrically programmable memories (EPROM) or electrically erasable and programmable (EEPROM) memories. Most generally, data storage 26, 30 is machine-readable data storage capable of housing stored data 20 from stored data archive 14. In the principal embodiments described hereinafter, data storage 26, 30 constitutes non-volatile, persistent storage, although data can be loaded from stored data archive 14 if necessary. As will be recognized by a person skilled in the art, however, the majority of the present disclosure can also be applied to systems 10 wherein data storage 26, 30 constitutes transient or volatile memory.

Queries 12 are addressed by a user or an out-of-system application to control node 22. Queries can, for example, be transmitted from user-side devices or applications physically remote from control node 22 and compute nodes 24. In some embodiments, control node 22 can be physically identical to compute nodes 24, differing only in function and configuration. Control node 22 processes queries (with processor 32), and gathers and stores requested data and assembled metadata (in data storage 30) responsive to queries 12. In addition, control node 22 coordinates redistribution or reorganization/reformatting of stored data 20 among data storage 26 of compute nodes 24. Control node 22 need not store persistently store any portion of stored data 20, but does serve as an intermediary aggregation point for subsets of stored data 20 and for metadata pertaining to stored data 20, as respectively stored in or generated by compute nodes 24. Data storage 30 of control node 22 stores a full mapping of stored data 20 across data storages 26 of compute nodes 24.

Queries handled through system 10 are through control node 22 using one or more (ordinarily one or all, as discussed below) compute nodes 24. In MPP systems, generally, queries addressed by control node 22 to multiple compute nodes 24 are first decomposed into subqueries based on the current distribution (as reflected in data storage 30 of control node 22) of stored data 20 across data storages 26 of multiple compute nodes 24. Data storage 26 of each compute node 24 stores at least one data table including the entirety of stored data 20, or a subset thereof, with hashing and organizational structure as described in greater detail hereinafter. This data set, in aggregate, takes the form of one or more distinct table objects containing data distributed and organized as described in greater detail below. If an individual compute node 24 lacks a necessary subset of stored data 20 to address a particular subquery, control node 22 directs that compute node to copy the required subset of stored data 20 from another compute node 24 as a step in execution of the query at issue.

Although FIG. 1 illustrates only four compute nodes, system 10 can in principle include a large and scalable number of compute nodes 24. Azure Synapse Analytics currently supports systems of between 1 and 60 compute nodes, but the present disclosure can be applied more generally to any number of distinct nodes. This scalability allows system 10 to accommodate larger compute tasks by distributing some tasks with heavier compute loads across multiple compute nodes, or by processing separate tasks in parallel across multiple compute nodes 24. Each query 12 processed through control node 22 has an associated compute load which can be partially described as of an expected number of processor cycles. Compute load also increases with the volume and number of of data transfers required between nodes, i.e. to copy data (transiently or persistently) from one compute node 24 to another. Compute load can depend on query complexity and the volume of stored data 20 queried. More relevantly to the present disclosure, compute load also depends on the hashing and distribution of stored data 20 across distributions (subtables) of all compute nodes 24 called by control node 22 to address a particular query. Thus, the organization of data stored across compute nodes 24 is heavily determinative of query compute loads. Higher compute loads imply longer runtimes, or require scaling of processing power through the addition of further compute nodes 24. Lower compute loads thus conversely allow queries to be executed more quickly, and/or allow a set of queries to be handled with fewer compute nodes, reducing expense. Data distributed across compute nodes 24 can be normalized to reduce duplication, or can be denormalized to increase duplication of data (across multiple compute nodes 24 or even within individual compute nodes 24). Normalization advantageously reduces required storage, while denormalization improves compute speed at scale. In general, different distributions of data will be preferred depending on multiple factors including, but not limited to: the data volume addressed expected queries, the volume of total data, the specific data fields interrogated, the frequency of particular queries, and time requirements associated with each query (i.e. maximum permissible compute time of the query). The present specification focuses on transformations of database structure among compute nodes 24—including both distributions of data across compute nodes 24 and the configuration of data storage within each compute node.

In parallel to the architecture of physical components as described above, FIG. 1 also illustrates a sample table T and distributions (subtables) $t_a$, $t_b$, $t_c$, etc thereof. Table T represents a logic layer aggregation of a subset (or the entirety) of stored data 20 visible from outside of system 10 through control node 22, and is not necessarily instantiated in memory at any single physical location. Distributions $t_a$, $t_b$, $t_c$, etc. represent (potentially overlapping) full replications or distributed subsets of table T actually stored in each physical device, i.e. across data storages 26 of the various compute nodes 24. Each physical compute node 24 can manage one or more distinct distributions t. Is should be understood that table T need not make up the entirety of stored data 20 processed by system 10. In other words, although the following tables T are generally described hereinafter as storing the entirety of relevant data in the following illustrative examples, table T can in represent only a subset of a larger data set. Where system 10 services multiple substantially independent data sets, database structure transformations described herein can be applied to each such subset (i.e. with its own table T) separately. Where multiple tables T are interrelated, the present approaches allow reduction of compute load by co-locating closely interrelated data.

Figure 2:
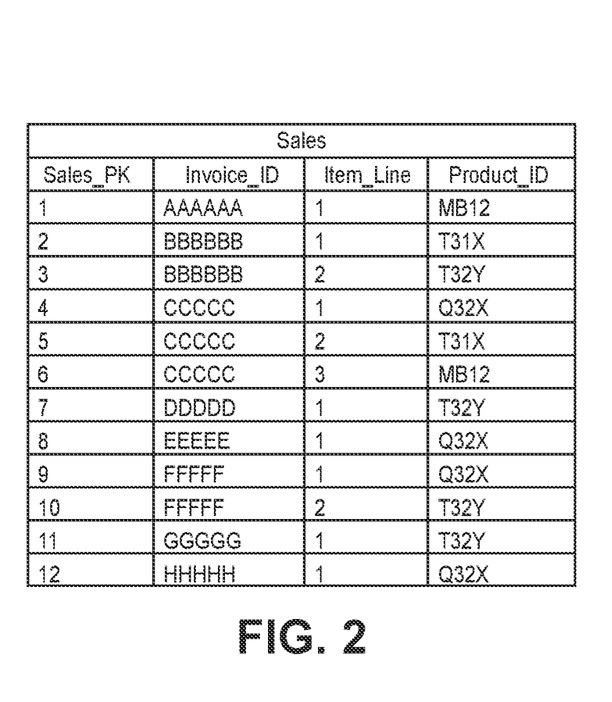
FIG. 2 is a simplified table of illustrative sales data.
Figure 3A:
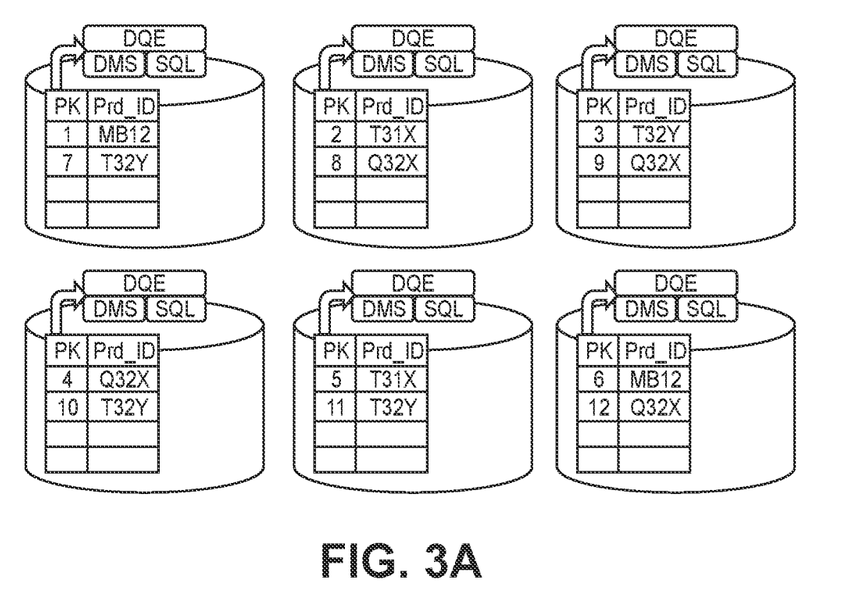
FIGS. 3A and 3B are distribution diagrams different distributions of this the data of FIG. 2 data across six illustrative compute nodes.
Figure 3B:
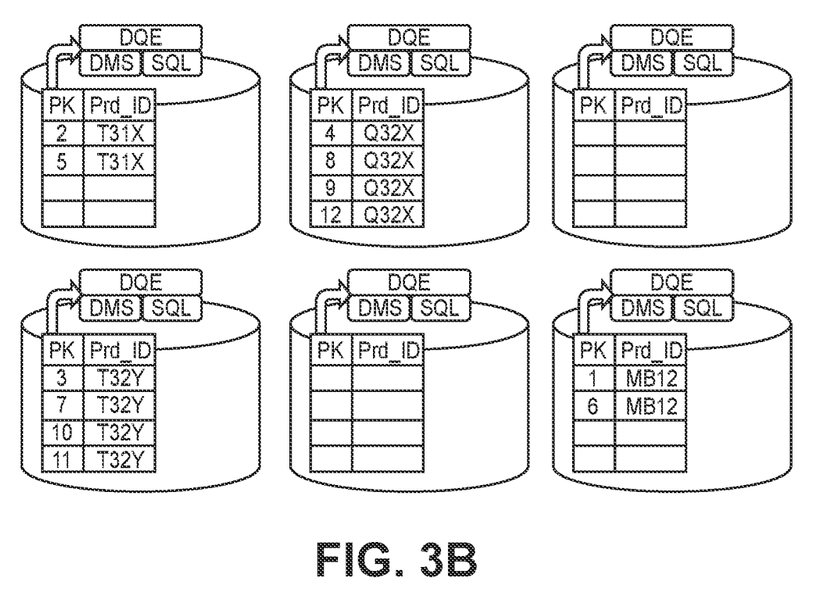

FIG. 2 is an example of a simplified table of fictional sales data, and FIGS. 3A and 3B are distribution diagrams of different distributions of this data across six illustrative compute nodes 24, in table form. Specifically, FIG. 3A illustrates a round-robin distribution of this data, FIG. 3B illustrates a hash distribution. FIGS. 2, 3A, and 3B are described together. It should be understood that FIGS. 2 and 3A and 3B are representative of much larger tables and distributions.

The database structure of system 10 includes several architecture features of data distributed across tables of compute nodes 24. Generally, database structure can vary in table distribution type and table storage type, as well including various further optimizations.

Although table T appears externally (i.e. to an operator or user application interacting with system 10 via control node 22) to be a single table with a multitude of rows, these rows are in fact distributed across many distributions $t_a$, $t_b$, $t_c$, as noted above. For the purpose of the present discussion, the entirety of stored data 20 will be assumed to take the form of a discrete number of table rows. These rows can include any number of corresponding fields (table columns). Azure Synapse Analytics supports three table distribution types (i.e. distribution algorithms): round-robin, hash, and replication.

As shown in FIG. 3A, a round-robin approach results in substantially even distribution of rows across all distributions t, and consequently allows fast loading and query processing by substantially evenly distributing compute load across all compute nodes 24. Round-robin type table distribution is valuable where no obvious join key is available for a hash (see below), and/or where table T does not share a join key in common with other tables. Round-robin distributions generally result in an effectively random assignment of rows across distributions t, with no guarantee that rows in a single distribution will have an equal number of values. This randomness can slow query resolution when resulting in increased need to transfer data between compute nodes. In the illustrated example, referring to FIGS. 2 and 3A, a query of (Item_Line) per product (product_ID) could only proceed as far as a first item in each distribution t with the data initially present in each compute node 24. Subsequent steps would require movement of data between nodes—either between compute nodes 24, or to control node 22. In general, Azure Synapse Analytics handles data transfer between nodes a dedicated Data Movement Service (DMS)

As shown in FIG. 3B, Hash-distributed tables improve query performance with high volume by organizing data for faster response to expected queries. Specifically, hash-distributed tables are organized and distributed by a distribution column designated as a hash key. A desirable hash key places data records with the same distribution key value in on the same node, with a number of distribution key values ideally greatly exceeding the number of nodes, to improve the likelihood of a substantially flat data distribution. Hash distribution groups rows with like distribution column (hash key) columns, reducing the need to move (copy) data between compute nodes for queries directed at particular distribution column values, or directed at fields strongly correlated with the hash key. Hash distribution can produce heavy skew between distributions, however, resulting in inefficient multiprocessing. In general, the slowest distribution (usually the distribution skewed to highest number of rows) will govern the overall processing time of a query. Furthermore, hash distribution only provides significant gains in compute efficiency where a useful hash key can be selected—that is, where a distribution column is available that minimizes data movement and allows relatively even distribution of processing tasks across multiple compute nodes. In the illustrated example of FIG. 3B, product ID serves as the distribution column. Referring to the previously illustrated example query of sales (Item_Line) per product (product_ID), with regard to FIGS. 2 and 3B, hashing by product ID allows each compute node to produce a portion of the requested answer (i.e. a sales count for one product ID) without requiring data transfer between nodes. Thus, the query can be executed with each compute node 24 reporting a sales count for one product ID to compute node 22. Although the selected hash is well suited to answering this particular query, queries as to other fields (e.g. sales per invoice #) would not necessarily receive any benefit from this pre-sorting of data across distributions t, and would likely suffer relative to an even round-robin distribution.

To flatten distribution (reduce skew), large logic layer tables can be partitioned into smaller, non-overlapping table-like data storage groupings based on partition criteria (i.e. smaller table objects each storing a subset of the whole data set) and thereby distributed across multiple compute nodes. In such instances, control node 22 will store a partition key identifying cutoffs between table partitions.

By contrast to both round-robin distribution and hash distribution, replication generates full copies of a table T to each compute node 24 (not illustrated), thereby reducing or eliminating the need for data transfer between compute nodes 24 in response queries. This reduced data transfer alleviates compute load at the expense of redundant and therefore space-inefficient use of data storage. In general, replication provides the fastest query performance for small tables by minimizing or eliminating data movement. For small tables, the scale of the table does not impose significant load (and therefore demand distribution), and the data storage space inefficiency incurred by duplicating data has less effect on compute load. For such tables, co-locating all or much of the data relevant to processing expected queries reduces overall compute load by eliminating unnecessary data transfer between nodes. Table objects are not ordinarily permanently replicated across multiple nodes. Rather, a table object will be stored permanently as a round-robin distribution, and replicated transiently across each node only while Synapse is active.

As discussed above with regard to FIGS. 2A and 2B, data movement between nodes is relatively expensive in terms of time and compute load, and is accordingly undesirable where avoidable. Where possible, related data from multiple tables relevant to an expected query or set of queries can be co-located at common compute nodes for reduced computation load in the form of reduced DMS usage. Replication of a small table in its entirety across all compute nodes can be combined, for example, with round-robin or hash distribution for larger tables, where a query requires correlating related data between multiple tables.

In addition to the table distribution types noted above, table objects have data storage types which also affects compute load/time. Storage types include clustered columnstore index (CCI), clustered (row) index, and heap storage without any sort of physical clustered indexing or sorting. Heap storage permits fast writing for staging, but provides no organizational benefits once stored. CCI is generally the preferred storage type for high volume in Azure Synapse Analytics, and stores data by record groups, with columnar compression. CCI data storage generally has improved performance for large tables, at the expense of increased maintenance and increased overhead in writing data compared to other storage types. Clustered (row) index storage, by comparison, provides records heap storage, but sorted by a specific column within a single distributed table. In addition to these table storage types, Azure Synapse Analytics also holds rows in delta store until sufficient rows are accumulated for column compression (i.e. for CCI). Several attributes of delta store data are tracked, including the number of uncompressed rows and the time since last compression (or, analogously, the last time that compression was performed).

Figure 4:
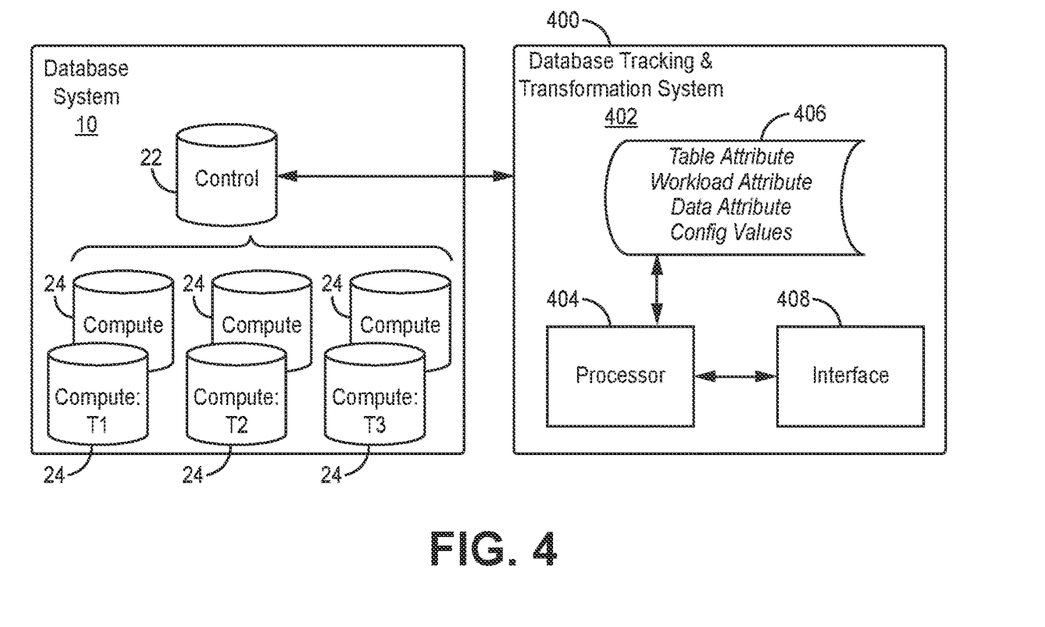
FIG. 4 is a system diagram of a system for generating and applying database transformations and transformation recommendations to the MPP database system of FIG. 1
Figure 5:
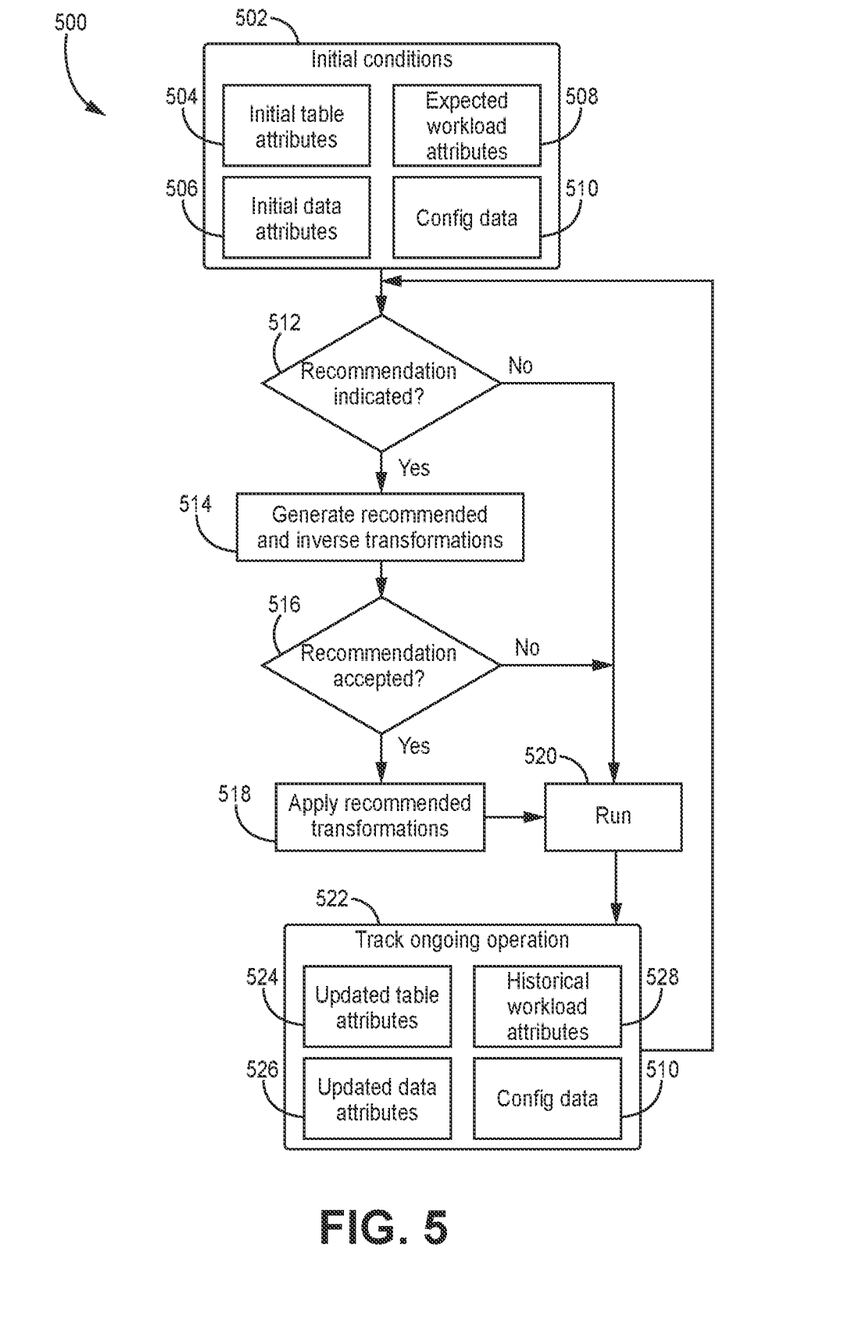
FIG. 5 is process flowchart illustrating a simplified overview of a process for optimizing compute performance of queries by transforming table distributions and configurations.

The present disclosure sets out to improve the performance of queries 12 by transforming the aforementioned and other database structures to increase compute efficiency by (1) reducing the number of records/rows that must be scanned to perform the query; (2) reducing the number of records/rows that must be moved from one compute node to another in performing the query; (3) distributing (e.g., in a substantially even manner) records across all 60 storage distributions available in Azure Synapse Analytics (i.e. low skew) to ensure similar response times from all compute nodes; and (4) reducing compute load required to decompress and read stored data (e.g. HEAP reads faster than CCI). In the most general case, these four principal goals are accomplished by generating and applying transformations of database structure across all tables of system 10. More specifically, the present system generates executable recommendations incorporating these database structure transformations. A need for such transformation is determined, and the transformation itself generated and recommended, based on collected Table Attributes, Workload Attributes, Data Attributes and Config Values, as discussed in greater detail below. FIGS. 4 and 5 are provided to help illustrate this process, and are discussed in detail below.

Table Attributes are obtained by programmatically scanning all database table objects and collecting specified characteristics of each table object. During initial database setup, or initial application of database tracking and transformation system 402 to an existing database system 10, Table Attributes are extracted from the initial state of table objects distributed across compute nodes 24 via control node 22. During subsequent ongoing operation, system 10 is monitored for any changes in these table attributes. Relevant attributes include the following, sometimes referred to hereinafter by key (T1-T17):

TABLE 1

Table Attributes

| | |
|---|---|
| T1 | Table distribution type |
| T2 | Table storage type |
| T3 | Distribution hash (for hash tables) |
| T4 | Storage skew |
| T5 | Clustered Index (for clustered index storage) |
| T6 | Columnstore Order Index (for CCI storage) |
| T7 | Partition (Boolean: partitioned or not) |
| T8 | Partition key (if partitioned) |
| T9 | Covering indexes (Boolean) |
| T10 | Number of rows |
| T11 | Physical size of table |
| T12 | Delta Store row count |
| T13 | Delta Store open count |
| T14 | Delta Store closed count |
| T15 | Delta Store compressed count |
| T16 | Delta store min compressed date |
| T17 | Delta store max compressed date |

T1 and T2 correspond to table distribution and storage types, respectively, as described above. T3 identifies the hash key used for a hash table, and T4 is a percentage measure of the degree to which hash tables are unevenly distributed across compute nodes, i.e. the percentage by which longest distributions exceed shortest. T5 and T6 are ordering indices for clustered index and CCI type data storage, respectively. T7 is a Boolean indicator flagging partitioned table objects, and T8 is an identifier of the delineation between partitions, for such table objects. T9 is a number of covering indexes associated with the table object. Generally, a large T9 can negatively impact compute performance. T10 and T11 identify table row length and data object size of the table, respectively. By way of example, a table object using heap storage would lack a T5 or T6 entry, and only a partitioned table would include a partition key (T8).

T12-T17 are attributes of the Delta Store used to accumulate rows for compression in CCI data storage. Azure Synapse will wait until a sufficient number of uncompressed rows have been accumulated before automatically performing compression, or can be forced to compress accumulated rows before earlier through execution of SQL commands. Compressing less than a nominally optimal number of rows can improve performance in some situations, particularly with tables that are rarely updated. T12 is a number of rows of data currently sitting uncompressed (e.g. new data), awaiting compression. T14 and T13 are subsets of T12: numbers of Delta Store rows marked for compression, or not yet so marked, respectively. T15 is a number of rows compressed in the table object. T16 is the earliest date associated with any open row set, for the specified distribution node. T16 is used to ensure that no row sits uncompressed for too long. T17 is the most recent date any Delta Store data has been compressed. T17 is used to ensure that avoid triggering compressions when the last compression was very recent, and more data may be coming in, and to ensure that the Delta Store does not sit uncompressed for an excessively long period.

In addition to the aforementioned table attributes, the present system tracks Workload Attributes related to queries executed or expected to be executed in system 10. Workload attributes include the following, sometimes referred to hereinafter by key (W1-W4):

TABLE 2

| | Workload Attributes |
|---|---|
| W1 | Queries executed on database |
| W2 | Number of times column used in JOIN |
| W3 | Number of times column used in WHERE |
| W4 | Number of times column present in other tables |
| W5 | Number of times column used to GROUP BY |
| W6 | Number of times table has been JOINED to |
| W7 | Number of times table has been GROUPED BY |

W1 is a list of specific queries 12 executed or expected to be executed on database system 10. W2 and W3 are the number of times a database column is used in JOIN or WHERE actions, based on these queries. W4 is the number of identical repetitions of a particular data column across all other tables. W5 is the number of times the table has been GROUPED BY a specific column. W6 and W7 represent the total number of times the tables has been JOINED to or GROUPED BY, regardless of columns used.

During initial database setup, or initial application of database tracking and transformation system 402 to an existing database system 10, Workload Attributes can be estimated based on expected queries and known current database structure. During subsequent ongoing operation, queries (W1) and actions (W2, W3) are recorded as they are executed, and a historical record of actual (rather than anticipated) workload attributes is maintained.

In some instances, specific Data Attributes may also be gathered when indicated by tracked Workload Attributes and/or Table Attributes. These Data Attributes include:

TABLE 3

| | Data Attributes |
|---|---|
| D1 | Number of unique values in column |
| D2 | Maximum number of occurrences of one value in column |
| D3 | Column datatype |

The above attributes are used in combination with Config Values to determine recommendations. Config Values can be based on general best practices, but are adjustable to accommodate variations in how database system 10 has been or is expected to be used. For example, with a database servicing streaming data loaded throughout the day, DELTA config values can be set to execute compression recommendations less frequently.

TABLE 4

| | Config Values |
|---|---|
| C1 | CCI order-by number WHERE actions required |
| C2 | Delta rebuild open row threshold |
| C3 | Delta rebuild total row threshold |
| C4 | Delta row push hours |
| C5 | Delta row push minimum count |
| C6 | Distribution unique value target count |
| C7 | Maximum heap row count |
| C8 | Maximum replicated GB size |
| C9 | Type for maximum replicated size |
| C10 | Maximum replicated row count |
| C11 | Minimum ColumnStore row size |
| C12 | Percentage skew tolerance |

C1 specifies a threshold number of WHERE actions for a column in TableColumnUsage. This threshold must be exceeded before a CCI order-by column is indicated.

C2-C5 are parameters specific to Delta Store values. C2 is a threshold value of open rows as a fraction of total rows (e.g. percentage) which, if exceeded, triggers a rebuild action.

C3 is a threshold value of total rows. If the actual number of Delta Store rows falls below this threshold, a rebuild is triggered.

C4 and C5 specify requirements for pushing open Delta Store rows. C4 is a minimum age before which rows will not be pushed. C5 specifies a minimum number of open Delta Store rows before any rows will be pushed (unless rows are very old).

C6 specifies a target number of unique values when targeting a best distribution. In general, hash distributions function best when a candidate distribution column includes a number of unique data values much greater than the number of distributions, increasing the likelihood that data will be distributed relatively evenly (i.e. with low skew) across all distributions. For 60 distributions, for example, C6 may be 12000, indicating a preference for at least 12000 unique values.

C7 is a threshold number of table rows. If a table object does not exceed this number of rows, it is a heap table is preferred (i.e. no clustered index). Conversely, heap data storage is discouraged for tables longer than this threshold.

C8-C10 govern threshold table size below which replication is desired. C9 specifies whether physical size (e.g. Gb) or row count used in this determination. C8 sets a corresponding threshold maximum physical size, while C10 sets a corresponding threshold maximum row count. Below the specified threshold replication is indicated. At and above the specified threshold, round-robin or hash distributions are preferred instead.

C11 is a minimum number of rows a table must have for CCI to be preferred as a table's data storage type.

C12 is a percentage skew representing permitted in an optimal distribution, e.g. 1.66% based on 60 assumed distributions.

The lists of Table Attributes, Workload Attributes, Data Attributes, and Config Values introduced above are presented to provide a useful working example of the present system, but need not be exhaustive. Other attributes and configuration parameters may be useful or even required in particular applications.

FIG. 4 is a system diagram of combined system 400 including both database system 10 (with control node 22 and multiple compute nodes 24) and database tracking and transformation system 402. FIG. 5 is process flowchart illustrating method 500. Method 500 provides a simplified overview of a process whereby combined system 400 generates recommendations and applies database structure transformations to system 10. FIGS. 4 and 5 are described together.

In the illustrated embodiment, database tracking and transformation system 402 is a simplified physical computer system with data processor 404, data storage 406, and interface 408. Data processor 404 can include any or more than one of a processor, a microprocessor, a controller, a digital signal processor (DSP), an application specific integrated circuit (ASIC), a field-programmable gate array (FPGA), or other equivalent discrete or integrated logic circuitry. Data storage 406 can include one or more of any type of persistent, non-volatile memory as set forth previously. Interface 408 can be a human user interface terminal with input/output devices in connection with user-facing application software run by data processor 404. Alternatively or additionally, interface 408 can be a transceiver or other physical data connection to one or more external device(s) (not shown), which can be user-operated and/or automated. In the most general case, interface 408 can be any source of external inputs to database tracking and transformation system 402 other than database system 10.

Combined system 400 is a system for generating and applying database transformations and transformation recommendations to database system 100. Database tracking and transformation system 402 monitors database system 10, identifying conditions under which the database structure of table objects distributed across compute nodes 24 shows signs of being non-optimal. Specifically, Table Attributes, Workload Attributes, Data Attributes are collected through controller 22 of system 10, and stored in data storage 406. Config Values are set through interface 408 and stored in data storage 406. Config Values can be adjusted to accommodate expected use conditions, e.g. trends in expected queries or data storage for system 10.

Although combined system 400 is depicted as including database tracking and transformation system 402 as a computer system physically separate from database system 10, this illustrates only one class of possible embodiments. In other embodiments, the data storage and processing of database tracking and transformation system 402 can in some instances be performed by control node 22 (i.e. by data storage 30 and processor 32, respectively; see FIG. 1), with only interface 408 being separable from database system 10.

FIG. 5 presents a simplified process—method 500—for improving performance of database system 10 by reducing compute load of expected queries. Portions of method 500 are expanded upon in FIGS. 6-8, as described hereinafter. Method 500 begins by evaluating the initial conditions of database system 10 (step 502). This initial evaluation can be performed with initial setup of database system 10, or can simply reflect a first instance of applying database tracking and transformation system 402 to database system 10. Step 502 includes polling controller 22 to collect initial values of Table Attributes (step 505) and Data Attributes (step 506) across all tables T present in compute nodes 24. Step 502 can optionally include specifying expected workload attributes (step 508) based, e.g., on expected queries or on analogy to existing historical data for similar applications. Finally, Step 502 includes specifying Config Values as set forth above. (Step 510).

Initial conditions determined in step 502 are stored or updated in data storage 406 and evaluated by data processor 404 as discussed in detail below with regard to FIG. 8 to determine whether the current database structure exhibits inefficiencies correctable by transformation. (Step 512). If a recommendation for correction is indicated by this evaluation, database tracking and transformation system 402 generates a recommended executable database structure transformation. (Step 514). This transformation can take the form of a SQL script and, if executed, will alter data storage type and/or distribution type of at least one table in database system 10. In at least some embodiments, system 402 additionally generates an inverse transformation capable of reversing the recommended transformation. Alternatively, system 402 can temporarily record the state of database system 10 for later rollback, should the recommended transformation prove undesirable.

Although the recommended transformation is preferably well-commented for readability, database tracking and transformation system 402 can also, in some embodiments, separately document the reasons for the recommended transformation. This documentation can include, but is not limited to, (1) a description of the recommended transformation, e.g. in the form of a list of changes to database structure; (2) an explanation of the reasoning behind each such change; (3) a list of key attributes (Table, Workload, or Data) at the time of recommendation; and (4) a list of recommended key attributes. The language and format of this documentation are automatically pulled by the same triggers that produce the transformation itself.

By reviewing this documentation and commented SQL code of the transformation itself, a system administrator or other user can evaluate whether to accept or reject a recommended transformation. (Step 516). In some embodiments of method 500, acceptance of the recommended transformation may be automatic, or may proceed automatically so long as no manual hold has been applied by a system administrator or other user.

Once the recommendation is accepted, the recommended transformation is applied and at least one table object in database system 10 is updated. (Step 518). Specifically, the transformation is transmitted to control node 22, which executes the SQL code therein to update distributions and storage types of table objects distributed across compute nodes 24. This transformation can require substantial compute resources, e.g. to redistribute, (re)hash, compress, or decompress data. To avoid unnecessary compute delays or compute burdens, generation and application of recommended transformations can be scheduled for low-activity time periods. Once a recommended transformation has been applied, a copy of the executed SQL script and a corresponding rollback script are archived (e.g. in data storage 402), and attribute metadata is updated (at control node 22) for all objects altered by the transformation. The executable SQL script constitutes a transformation mapping an initial state of the table object at issue into a candidate state corresponding to an improved or recommended state indicated in step 514. Conversely, the rollback script can be an inverse mapping from the recommended table state back to the original state of the table.

Once a recommendation is accepted and applied, or once a recommendation is rejected or not indicated by database tracking and transformation system 402, database system 10 returns to (or begins) normal operation. (Step 520). During this normal operation, system 402 continues to track ongoing states of system 10 (step 522), updating Table Attributes and Data Attributes with any changes (steps 524, 526) and recording queries and other associated Workload Attributes during actual activity (step 528). Config Data need not be tracked across ongoing operation of system 10, but can be reevaluated and updated when appropriate, e.g. where use conditions of database system 10 change significantly. (Step 510).

After combined system 400 has been allowed to run for a specified period, database tracking and transformation system 402 re-evaluates whether a recommended transformation is indicated by the collected attributes and config data, and the aforementioned process repeats from step 512. The frequency of this evaluation can be selected based on the rate of change of database data, and the frequency of queries. Specifically, the time between recurrences of step 512 should be long enough to allow significant accumulation of new historical workload attributes (step 528).

Method 500 and combined system 400 provide means for continuously or periodically tracking database attributes and re-evaluating database structure (distribution, data storage types). Method 500 uses system 402 to generate and apply transformations to table objects of database system 10, thereby reducing compute load to increase compute speed or reduce the number of distinct compute nodes required for satisfactory database operation.

Figure 6:
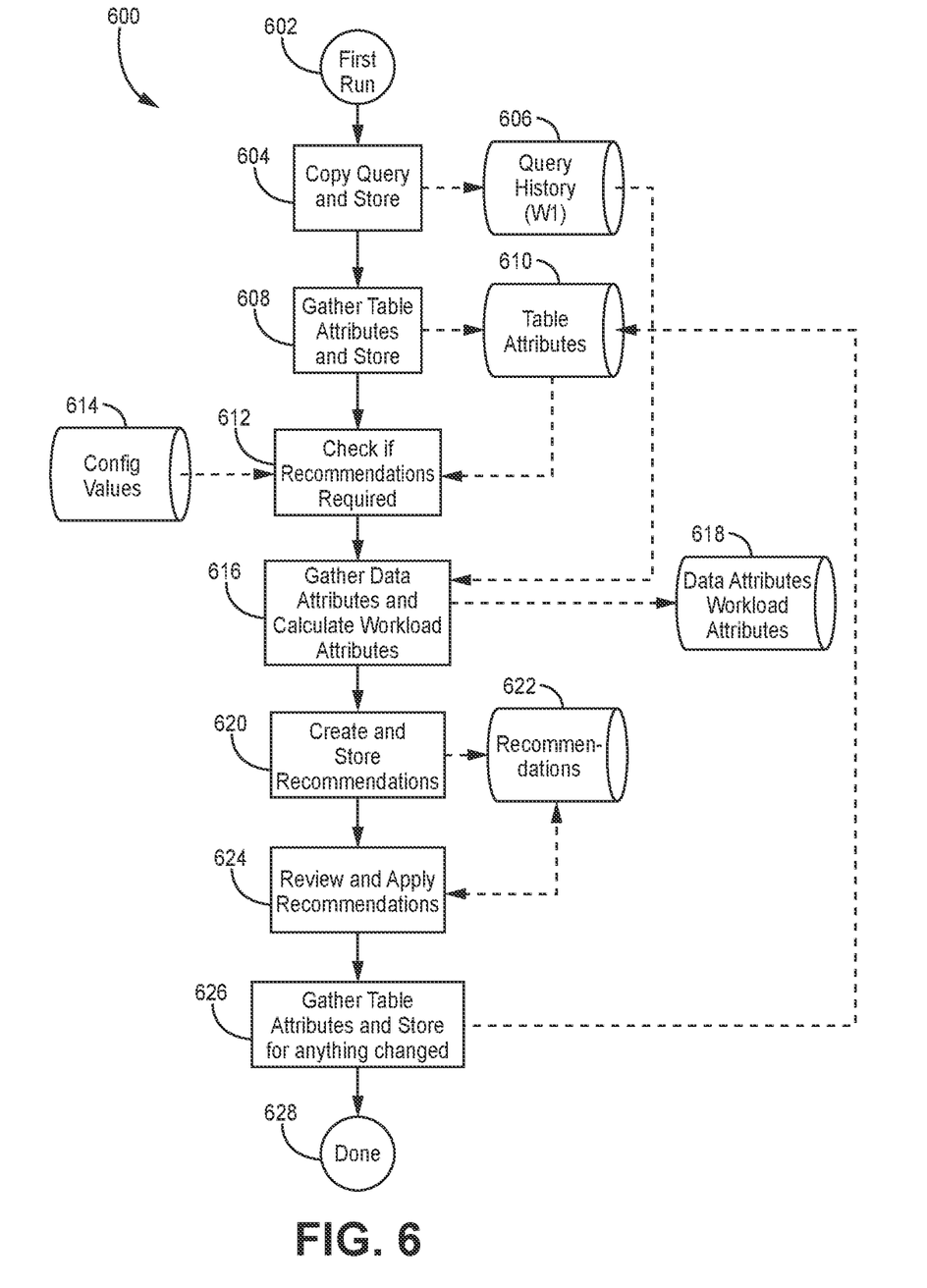
FIG. 6 is a logic flowchart illustrating an initial process for database structure optimization.

FIG. 6 is a logic flowchart of process 600, which presents one embodiment of an approach to method 500 in an initial or setup stage.

From the start (602) of a first run of combined system 400, each query (W1) is copied and stored (604) in an archive or list of query history (606). In some instances, expected queries can be provided where historical data is not yet available. Table Attributes are gathered and stored (608) in data storage 406 (610). If a recommend transformation is preliminarily indicated (612) based on an evaluation of Config Values (614) and Table Attributes (610) (see FIG. 8, described below), then remaining Workload Attributes (W2-W7) are calculated based on query history, and Data Attributes are retrieved if indicated to be necessary based on Table and Workload Attributes.

Collected Workload Attributes, Table Attributes, Data Attributes, and Config Values are used to generate a recommended transformation, as described above with respect to FIG. 5 and as further explained below with regard to FIG. 8. This transformation SQL code and its accompanying recommendation documentation are stored in data storage 506 (622). The recommended transformation is then reviewed and applied by control node 22, if accepted (624). Adjusted Table Attributes are then stored, based on the applied transformation, in data storage 406 (610).

Figure 7:
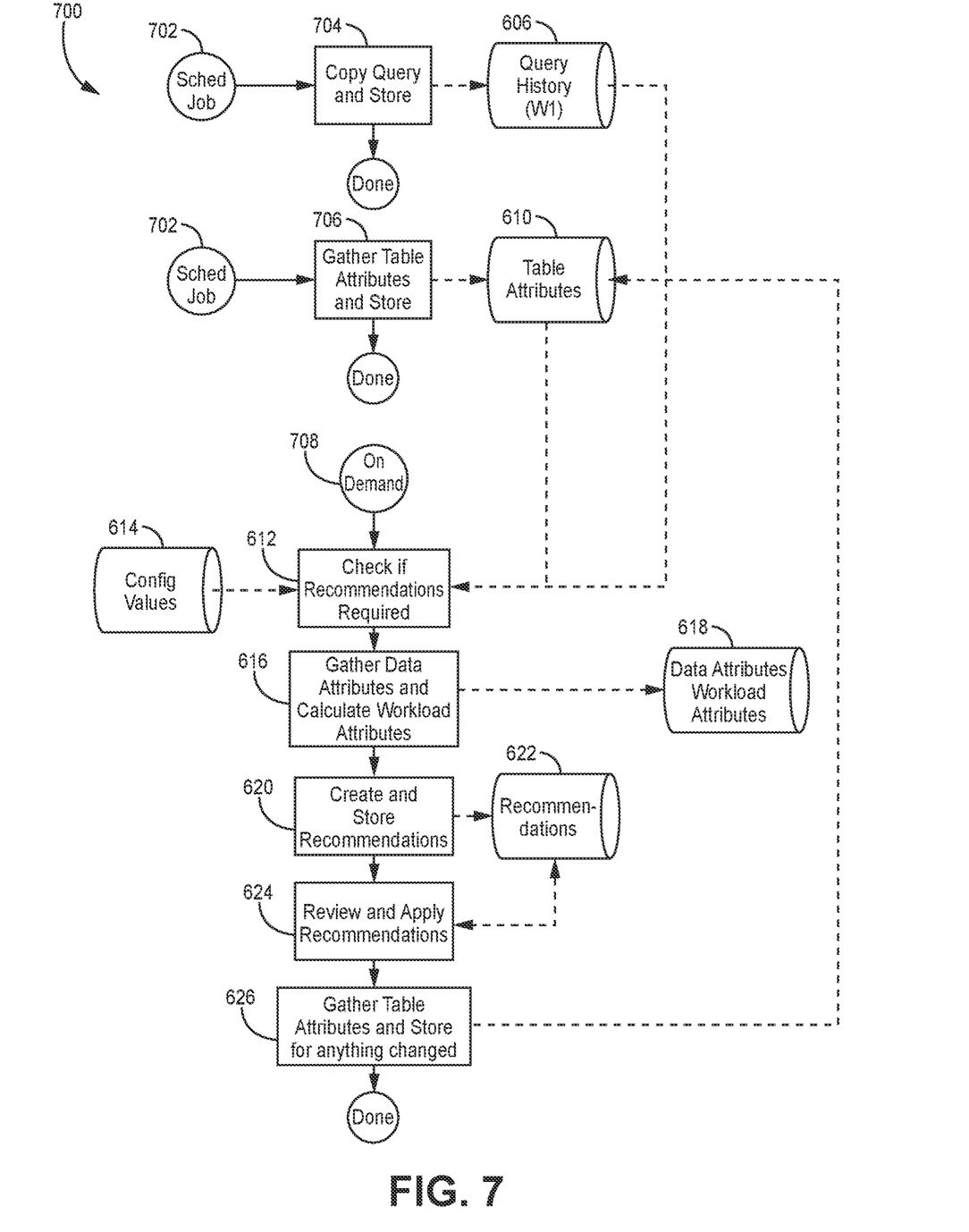
FIG. 7 is a logic flowchart illustrating an ongoing process for data collection for database structure optimization.

FIG. 7 is a logic flowchart of process 700, which presents one embodiment of an approach to method 500 in an ongoing, post-setup stage. Several steps of process 700 are identical to steps of process 600, and have been described with respect to FIG. 6, in the foregoing.

After the first run approach of process 600, jobs are scheduled at appropriate intervals (702) to copy and store queries (704) and table attributes (706) to data storage 506 (606 and 610, respectively). The scheduled frequency of these tasks can initially be high (e.g. hourly), slowing over time (e.g. to weekly) as the database schema stabilizes across multiple iterations of process 700. Schedules can be updated, e.g. with increased frequency, as necessitated by additions or significant changes to table objects of database system 10 from sources other than transformations generated by database tracking and transformation system 402.

Process 700 matches process 600 from step 612, which can be triggered on demand (708) rather than as an immediate action following step 608. More generally, system 402 can evaluate whether a transformation recommendation is indicated in view of the Config Values, Table Values, and query history (or based on Workload Attributes, more generally) as a regularly scheduled job, as a manually activated tasks initiated by a system administrator or other human user, or as an automated response to unexpected performance (e.g. slow query resolution). The details of step 612 are unchanged between processes 600 and 700, and are described in greater detail with respect to FIG. 8, below.

Figure 8:
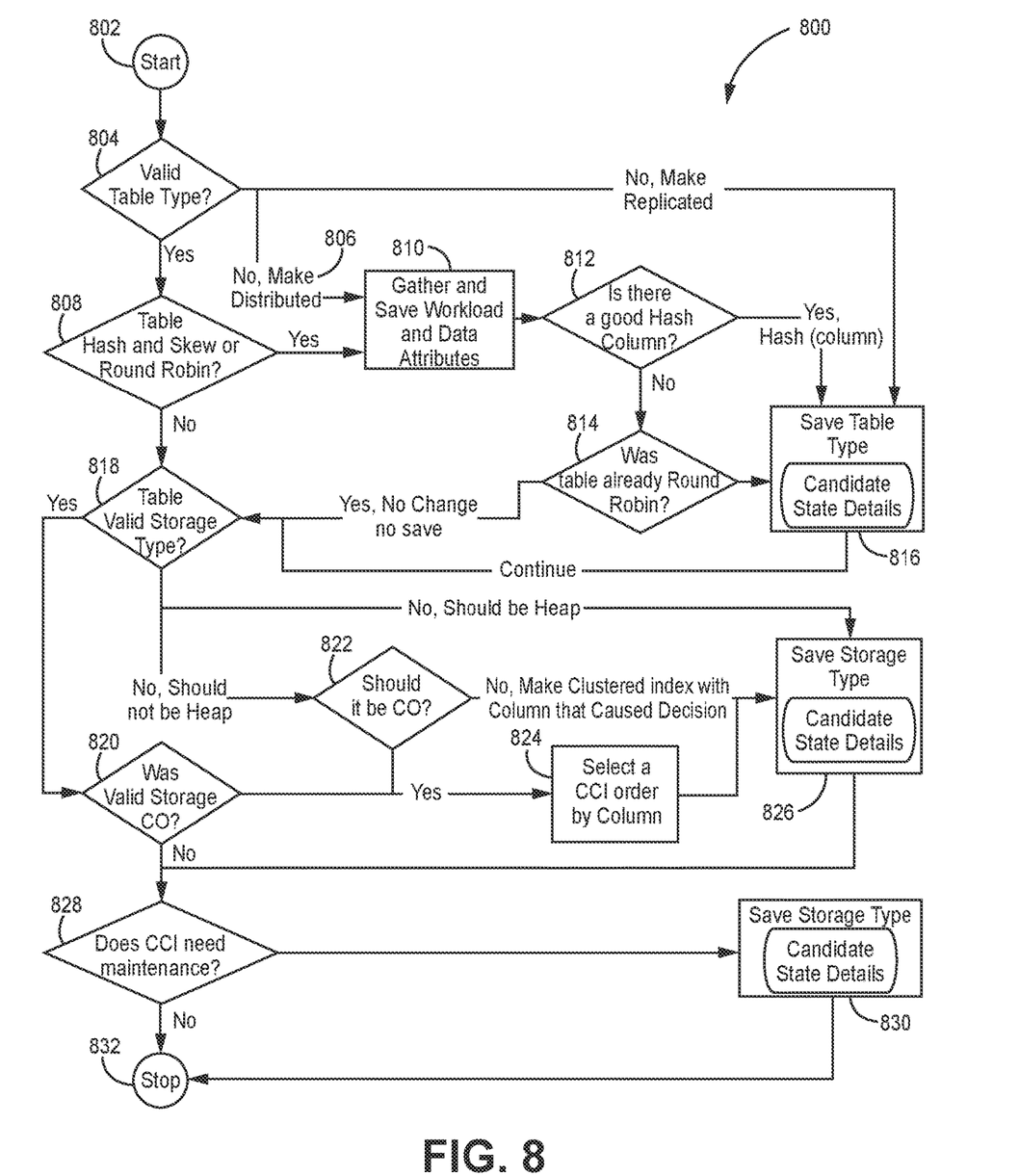
FIG. 8 is a process flowchart illustrating recommendation and transformation generation used in the processes of FIGS. 5 and 6.

FIG. 8 is a process flowchart expanding on steps 612, 616, and 620 of processes 600 and 700. FIG. 8 depicts process 800, which can be initiated (step 802) from steps 708 or 608 of processes 700 or 600, respectively. Process 800 is evaluated on a table-by-table basis, and can be repeated to address multiple tables. All steps of process 800 are performed in data processor 404 of database tracking and transformation system 402, by reference to stored records of Table Attributes, Workload Attributes, Data Attributes, and Config Values in data storage 406. As discussed above, these values are variously retrieved through control node 22 of database system 10, and specified through interface 408.

First, data processor 404 determines whether each table object has a valid type based on replication rules set in the Config Values (614). (Step 804). Specifically, data processor 404 selects a type for maximum replicated table size as specified by C9, retrieves the appropriate maximum value C8 (maximum replicated GB size) or C10 (maximum replicated row count), and compares this value against the corresponding Table Attribute T11 (physical size of table) or 10 (number of rows), respectively. If C10>T10 or C8>T11, the table should not be replicated; otherwise, replication is preferred. In some embodiments, processor 404 may process both of these evaluations (i.e. C10>T10 and C8>T11), preferring a replicated table only if both inequalities hold. If the table type indicated by this comparison matches the type of the table object being evaluated (i.e. T1), step 804 reports the table as valid. If step 804 reports that the table is invalid (i.e. should be distributed but is replicated, or should be replicated but is distributed), the table is marked to be restructured. (Step 806).

If step 804 reports that the table is valid, data processor 404 next evaluates whether the table uses a round-robin distribution type or a hash type (T1=ROUNDROBIN or HASH). (Step 808). If the table object is a hash table, data processor 404 evaluates whether the storage T4 (storage skew)<C12 (skew tolerance). If T1=ROUNDROBIN, or if (T1=HASH AND T4>C12), step 808 flags a possible issue (yes); otherwise (no) process 700 proceeds to step 818 (evaluating validity of table storage type; see below).

If an issue is flagged at step 808, or if step 804 indicates that the table object is an invalid replicated table, data processor 404 gathers and saves Workload and Data Attributes W2 (number of times column was used in JOIN), W3 (number of times column was used in WHERE), W4 (number of times column was present in other tables), D1 (number of distinct values in column), D2 (maximum number of occurrences of a single value in column), and D3 (number of times column was present in other tables) to determine whether a strong hash column exists. W2-W7 are generated by parsing the collected query history W1 (stored at 606). D1, D2, and D3 are retrieved by scanning, sampling, and aggregating data from individual columns of the table at issue. All data collected in this process is stored in data storage 406, and evaluated at step 812.

In step 812, Workload and Data Attributes are examined and evaluated against Config Values, and scored for each column in the table, with higher point totals indicating that the column is a good hash candidate. INT datatype is scored higher than (i.e. preferred in a hash key to) String datatype.

Column appearance in other large tables contribute points, as does column frequency in JOIN or GROUP BY actions, so long as the column includes an adequate (high) number of unique data values. Points are subtracted for any single value having a large number of occurrences, which can cause skew. A minimum number of domain values (distinct values) must be found, or points are subtracted; a high number of distinct values contributes points to the evaluated column. After evaluating the point score of each column, round-robin distribution type is marked (recommended) if no column score exceeds a round-robin threshold. Otherwise, the table is marked (recommended) for hash distribution using the column with the highest score as the hash key (i.e. distribution column).

Step 812 can be illustrated by way of a simplified example as set forth below. First: for every column with a hash-appropriate datatype (e.g. int, bigint, smallint, Numeric, or decimal), collect D1, D2, W2, W4, and W5. For the table as a whole, retrieve T10, W6, and W7. The table can then be scored as follows:

Number of unique values:
IF D1>C6 THEN SCORE+=200
ELSE IF D1>C6/2 THEN SCORE+=150
ELSE IF D1>C6/3 THEN SCORE+=100
ELSE IF D1>C6/10 THEN SCORE+=25
ELSE SCORE-=10,000
Maximum number of a single value:
IF D2/D1<0.05 THEN SCORE+=100
ELSE IF D2/D1<0.1 THEN SCORE+=50
ELSE IF D2/D1<0.2 THEN SCORE+=40
ELSE IF D2/D1<0.3 THEN SCORE+=25
ELSE SCORE-=10,000
Times column used in JOIN:
SCORE+=(W2*100)/W6*4
Times column used in GROUP BY:
SCORE+=(W5*100)/W7*2
Other tables with this column name:
SCORE+=W4*75

A person skilled in the art will understand that the specific exemplary scoring values mentioned herein can be varied depending on the specific application. For an exemplary (unrealistically small) table with 20 columns and 4 columns (A, B, C, and D), with T10=20, W6=10, and W7=2, the relevant attributes might for example be as follows:

| Column | D1 | D2 | W4 | W2 | W5 |
|--------|----|----|----|----|----|
| A | 20 | 1  | 0  | 0  | 0  |
| B | 17 | 3  | 1  | 2  | 0  |
| C | 2  | 12 | 5  | 3  | 3  |
| D | 19 | 2  | 2  | 4  | 1  |

According to this example, scoring of columns A-D would proceed as follows:
Column A
D1>C6 SCORE+=200;
D2/D1<0.1 SCORE+=50; no points for anything else
SCORE=250
Column B
D1>C6/2 SCORE+=150;
D2/D1<0.2 SCORE+=40;
W2=2 SCORE+=80; from JOINs
W4=1 SCORE+=75 from same column name count
SCORE=345
Column C
D1>C6/10 SCORE+=25;
D2/D1 !<0.3 SCORE-=10000, effectively making column ineligible as a hash
W2=3 SCORE+=120; from JOINs
W5=3 SCORE+=60; from GROUP BYs
W4=5 SCORE+=375 from same column name count
SCORE=-9420
Column D
D1>C6 SCORE+=200;
D2/D1<0.2 SCORE+=40;
W2=4 SCORE+=160; from JOINs
W5=1 SCORE+=20; from GROUP BYs
W4=2 SCORE+=150 from same column name count
SCORE=570

According to this example, the highest scored column—D, with a score of 570—would be identified as a strong distribution column candidate. A confidence level in a particular hash can be assigned based on each column's score, e.g. "very high" for scores >350, "high" for scores >250, "medium" for scores >150, and "low" for lower scores. This confidence level can, for example, be used to document recommendations as described elsewhere herein.

Proceeding on from step 812, if the table at issue was already a round-robin table, no change to table type is required. Otherwise, the type specified by step 804 (if replicated is preferred) or 812 (if hash or round-robin) is saved as the distribution type of a candidate state for a transformed table object, and will be used to generate the recommended transformation and related documentation.

Next, data processor 404 evaluates whether the table being evaluated has a valid storage type (T2). (Step 818). If (T2=HEAP and T10 (number of rows) >C7 (maximum heap row size)) or if (T2< >HEAP, and T10<C7), then the table returns as having invalid storage type. If the table returns as invalid, and should use heap storage, this storage type is saved as the storage type of the candidate table object state. (Step 826). Otherwise, further evaluation is required.

Data processor 404 next evaluates whether the table type should be CCI. (Step 822). In general, if the appropriate table storage type is not heap, CCI is ordinarily the appropriate table storage type. If a string column is used as the primary WHERE clause in a majority of queries (see W1), however, then CCI is inefficient, as column compressed data must be uncompressed to allow WHERE evaluation of strings. In this event, a Clustered Index storage type is preferred, with the column containing that string as the index. Otherwise, CCI is preferred. If Clustered Index storage type is indicated, this storage type is saved as the storage type of the candidate table object state. (Step 826). Otherwise, further evaluation is required.

If CCI storage was indicated (either in the form of a valid CCI storage type from Step 818 or a CCI preference from step 822), the column with the highest value of W3 (number of times column used in WHERE) is set as the column by which the table should be ordered, so long as W3>C1 (CCI order-by number WHERE actions required). (Step 824) If no column is specified by which the column should be ordered (i.e. in step 824), Synapse will select a column independently. The resulting CCI format is saved as the storage type of the candidate table object state to be used by the transformed table. (Step 826)

For non-CCI tables, this concludes process 800 (expanding upon step 612, 616, and 620 from FIGS. 6 and 7). For tables using CCI storage, a final evaluation of CCI maintenance is required. (Step 828). Generally, if the oldest rows retained in the Delta Store have been retained for long enough, and there are enough rows in the Delta Store, those rows should be compressed. Thus: if the difference between current time and T16 (delta store minimum compressed date) is greater than C4 (delta row push hours), and T13 (delta store open count) exceeds C5 (delta row push minimum count, this update maintenance update to the table is saved for the candidate table object storage type. (Step 830). As a further exception, even if T13<=C5, compression of Delta Store rows is indicated if the difference between T17 (delta store max compressed date) and T16 exceeds C3 (delta rebuild total row threshold). If step 828 indicates that compression is required for CCI maintenance, the candidate table object state is saved to reflect this storage type recommendation.

Once all preceding triggered steps of process 800 have been evaluated or executed, process 800 terminates at step 832, having generated updates to table type (816) and storage type (826, 830) in the form of a candidate table object state. Once a candidate table object state for transformation has been set and stored in data storage 400 by following process 800, and supporting documentation of the recommendation of that candidate state has been generated as noted above, the recommendation can be accepted or rejected, as discussed above with respect to FIGS. 6 and 7. In some instances this process may be automatic, e.g. with all recommendations within specified parameters being accepted. In some instances this process may be manual, e.g. with a database administrator reviewing and approving the recommendation by selecting an "approve" or "disapprove/ignore" script. In either event, once a recommendation is approved, data processor 404 verifies that the candidate state is still valid, i.e. that changes since the recommendation was generated have not obviated the recommendation by altering the state of the table. For example, a recommendation to restructure a round-robin distribution as a hash distribution might be invalidated by intervening restructuring of the table object as hash distributed or replicated.

Once a candidate table object state has been approved and validated, data processor 404 provides control node 22 with a SQL statement defining all table attributes of the candidate table object. Control node 22 creates a new table object as specified by these attributes, and populates this transformed replacement table from the previously existing table. The transformed replacement table is then validated to ensure that no further data has been received during this process, which could otherwise be lost. The old table is then renamed and archived, and the new table reflecting the candidate table object state is saved as a replacement for (i.e. renamed to replace) the original table object.

Applying this process to multiple tables yields multiple semi-independent table transformations, which collectively form a database structure or scheme transformation. Recommendations and The methods described herein with respect to FIGS. 4-8 set forth a process using combined system 400 to identify inefficiencies in table format and consequently database structure. These inefficiencies are addressed by the generation and application of transformations resulting in reduced compute load, and consequently faster compute time or reduced compute node requirements.

Discussion of Possible Embodiments

The following are non-exclusive descriptions of possible embodiments of the present invention.

A method of improving compute performance of a distributed database system, the method comprising: querying a control node of the distributed database system to ascertain a plurality of attributes characterizing an initial state of a table object in the distributed database system; recording queries executed in the distributed database system, the queries including calls of the table object; generating a candidate state of the table object with lower compute load for the queries, relative to the initial state of the table object, based on the queries and at least a subset of the plurality of attributes; assembling an executable transformation that maps the initial state of the table object to the candidate state of the table object; and executing the executable transformation on the table object.

The method of the preceding paragraph can optionally include, additionally and/or alternatively, any one or more of the following features, configurations and/or additional components:

A further embodiment of the foregoing method, wherein the executable transformation is a SQL script.

A further embodiment of the foregoing method, further comprising generating an executable rollback that maps the candidate state of the table object to the initial state of the table object.

A further embodiment of the foregoing method, further comprising: generating a recommendation that documents the candidate state, the original state, and the expected compute efficiency benefit of the candidate state over the original state; and triggering the execution of the executable transformation based on user approval of the recommendation.

A further embodiment of the foregoing method, wherein the executable transformation alters at least one of a distribution type and a storage type of the table object.

A further embodiment of the foregoing method, wherein the plurality of attributes includes table attributes characterizing the distribution type of the initial state of the table object.

A further embodiment of the foregoing method, wherein the plurality of attributes includes data attributes characterizing the data storage type of the initial state of the table object.

A further embodiment of the foregoing method, further comprising defining configuration values specifying at least one of: a maximum row count for heap data storage; a minimum row count for ColumnStore Index data storage; a maximum table size for replicated table distribution; a maximum skew tolerance for hash distributed tables; and a maximum time limit for compressing Delta Store data in a CCI table; wherein the determination of the candidate state of the table object is a function of the subset of the plurality of attributes, the queries, and the configuration values.

A further embodiment of the foregoing method, wherein recording queries comprises logging and persistently archiving a history of queries executed by the database system on the table object.

A further embodiment of the foregoing method, further comprising deriving workload attributes from the queries and the initial state of the table object, the workload attributes describing at least one of: a number of times each column is used in a JOIN by the queries; a number of times each column is used in a WHERE by the queries; and a number of times each column is present in other table objects within the database systems wherein the determination of the candidate state of the table object is a function of the subset of the plurality of attributes, the queries, and the workload attributes.

A further embodiment of the foregoing method, wherein determining an candidate state of the table object with lower compute load for the queries, relative to the initial state of the table object, comprises identifying a table distribution requiring less data movement between multiple compute nodes, for the queries.

A method of generating a computer-executable database structure transformation applicable to a table object in a distributed relational database, the method comprising: assembling initial table attributes of the table object; assembling workload attributes corresponding to queries on the table object; defining preference conditions for table distribution and data types via configuration values; determining whether the table object is non-optimal through comparison of the configuration values against the workload attributes and table attributes; specifying an improved structure of the table object by distribution and data type, when the table object is non-optimal; generating executable code mapping the table object to the improved structure.

The method of the preceding paragraph can optionally include, additionally and/or alternatively, any one or more of the following features, configurations and/or additional components:

A further embodiment of the foregoing method, further comprising reducing the compute load of the table object by applying the executable code to the table object.

A further embodiment of the foregoing method, wherein determining whether the table distribution is non-optimal includes evaluating whether a distribution type and a storage type of the table object are valid in view of the configuration values, the workload attributes, and the table attributes.

A further embodiment of the foregoing method, further comprising updating the table attributes as the table object changes.

A further embodiment of the foregoing method, wherein assembling the workload attributes comprises recording historical queries, and evaluating the frequency of JOIN and WHERE actions from the historical queries on a column-by-column basis with respect to the table object.

A further embodiment of the foregoing method, wherein the table attributes comprise quantitative characteristics of the table object matched with the configuration values, such that determining whether the table object is non-optimal includes evaluating inequalities between multiple of the configuration values and corresponding of the table objects.

A further embodiment of the foregoing method, further comprising assembling data attributes including: a number of distinct values in each column; a maximum number of occurrences of any single value in each column; and a column datatype; wherein determining whether the table object is non-optimal includes evaluation of CCI formatting of the table object by comparison of the data attributes, table attributes, and configuration values.

A further embodiment of the foregoing method, further comprising: applying the executable code to the table object, thereby updating the table object to the improved structure; and tracking the table attributes and the workload attributes after applying the executable code to the table object.

A further embodiment of the foregoing method, wherein, in the course of executing the queries, the improved structure of the table object exhibits at least one of: reduced number of records scanned; reduced volume of data transferred between nodes of the distributed relational database; and reduced skew of records across storage distributions of the distributed relational database.

SUMMATION

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, alignment or shape variations induced by thermal, rotational or vibrational operational conditions, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of improving compute performance of a distributed database system, the method comprising:
   querying a control node of the distributed database system to ascertain a plurality of attributes characterizing an initial state of a table object in the distributed database system;
   recording queries executed in the distributed database system, the queries including calls of the table object;
   generating a candidate state of the table object with lower compute load for the queries, relative to the initial state of the table object, based on the queries and at least a subset of the plurality of attributes;
   assembling an executable transformation that maps the initial state of the table object to the candidate state of the table object, wherein the executable transformation alters at least one of a distribution type and a storage type of the table object; and
   executing the executable transformation on the table object.

2. The method of claim 1, wherein the executable transformation is a SQL script.

3. The method of claim 1, further comprising generating an executable rollback that maps the candidate state of the table object to the initial state of the table object.

4. The method of claim 1, further comprising:
   generating a recommendation that documents the candidate state, the original state, and the expected compute efficiency benefit of the candidate state over the original state; and
   triggering the execution of the executable transformation based on user approval of the recommendation.

5. The method of claim 1, wherein the plurality of attributes includes table attributes characterizing the distribution type of the initial state of the table object.

6. The method of claim 1, wherein the plurality of attributes includes data attributes characterizing the data storage type of the initial state of the table object.

7. The method of claim 1, further comprising defining configuration values specifying at least one of:
   a maximum row count for heap data storage;
   a minimum row count for ColumnStore Index data storage;
   a maximum table size for replicated table distribution;

a maximum skew tolerance for hash distributed tables; and a maximum time limit for compressing Delta Store data in a CCI table;

wherein the determination of the candidate state of the table object is a function of the subset of the plurality of attributes, the queries, and the configuration values.

8. The method of claim 1, wherein recording queries comprises logging and persistently archiving a history of queries executed by the database system on the table object.

9. The method of claim 8, further comprising deriving workload attributes from the queries and the initial state of the table object, the workload attributes describing at least one of:

a number of times each column is used in a JOIN by the queries;

a number of times each column is used in a WHERE by the queries; and a number of times each column is present in other table objects within the database system, wherein the determination of the candidate state of the table object is a function of the subset of the plurality of attributes, the queries, and the workload attributes.

10. The method of claim 1, wherein determining an candidate state of the table object with lower compute load for the queries, relative to the initial state of the table object, comprises identifying a table distribution requiring less data movement between multiple compute nodes, for the queries.

\* \* \* \* \*